Figure 1:
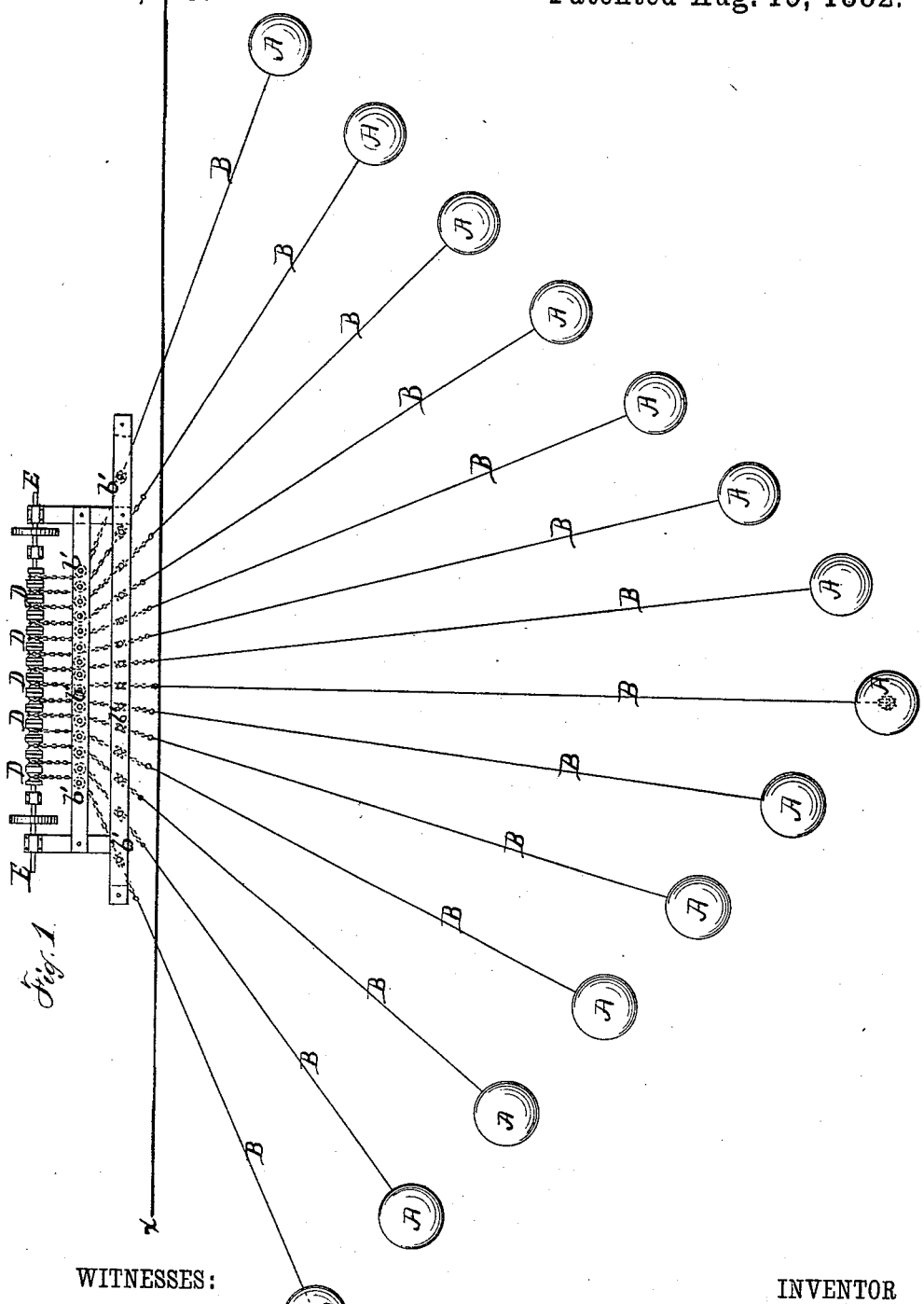

(No Model.)  2 Sheets—Sheet 1.

I. L. ROBERTS.
WAVE POWER APPARATUS.

No. 262,693.  Patented Aug. 15, 1882.

WITNESSES:
A. S. Fitch
A. G. N. Vermilye

INVENTOR
Isaiah L. Roberts
BY S. Fitch,
ATTORNEY (No Model.)  2 Sheets—Sheet 2.
I. L. ROBERTS.
WAVE POWER APPARATUS.
No. 262,693.  Patented Aug. 15, 1882.
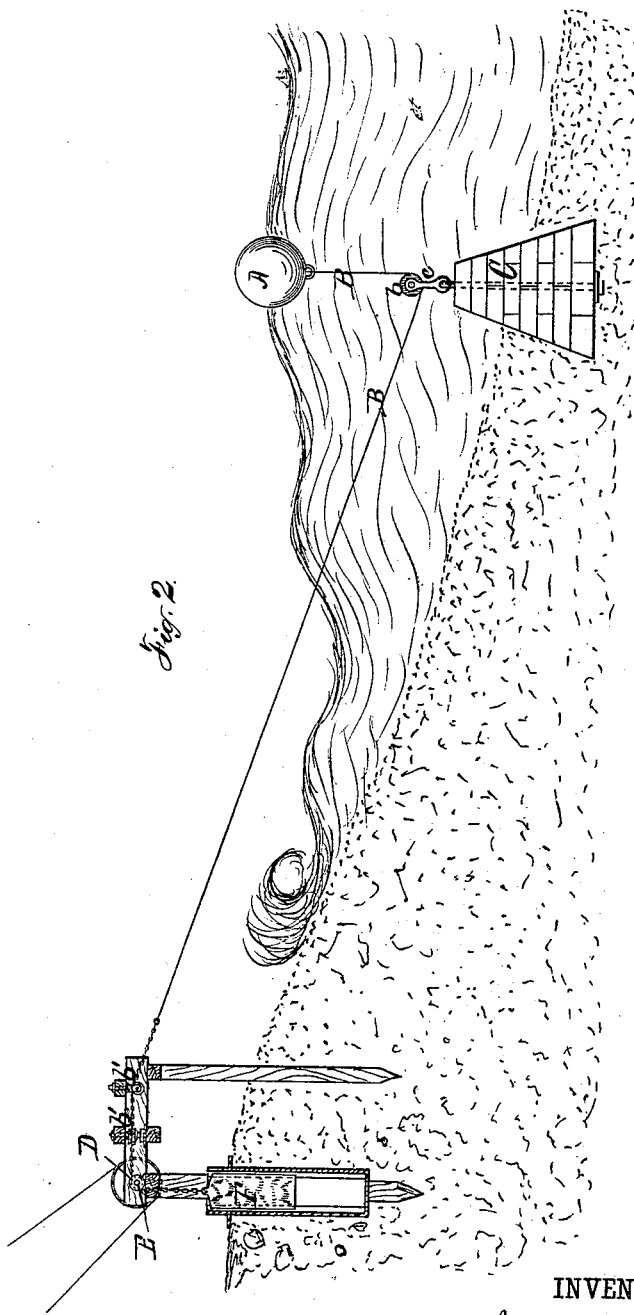

UNITED STATES PATENT OFFICE.

ISAIAH L. ROBERTS, OF JACKSONVILLE, FLORIDA, ASSIGNOR TO DEMAS BARNES, OF BROOKLYN, NEW YORK.

WAVE-POWER APPARATUS.

SPECIFICATION forming part of Letters Patent No. 262,693, dated August 15, 1882.

Application filed December 22, 1881. (No model.)

*To all whom it may concern:*

Be it known that I, ISAIAH L. ROBERTS, of Jacksonville, Duval county, State of Florida, have invented an Improved Wave-Power Apparatus, of which the following is a full, clear, and exact description, reference being had to the accompanying drawings, forming part of this specification.

My invention relates to an apparatus for utilizing the wave or swell motion of a sea or other body of water to rotate a shaft continuously and uninterruptedly in one direction for the purpose of producing power; and my invention consists in a series of buoys, the longitudinal axis of which extends out from the line of the coast or shore of the body of water over such a number of waves or swells as that one or more of said buoys will at all times be falling, while the others are rising on said waves or swells, and each of said buoys being attached to one end of a cable, which passes around a pulley or other suitable device fixed in an anchorage on the sea-bottom, the opposite end of said cable reaching to and upon the shore, where it passes over a clutch or other similar device on a shaft mounted in bearings on said shore, and has attached to its extremity a counter-weight, all as hereinafter particularly described, whereby the rise of the buoys on the waves or swells will operate through said cables to elevate said weights, and the falling of the weights will, through said clutch devices, operate to rotate the shaft, and whereby the buoys of the series may be placed indiscriminately relatively to each other in the line of the lateral axis of the series, and whereby a shaft may be employed the total length of which may be considerably less than the sum of the diameters of all the buoys of the series, and whereby the erection of a pier or frame-work to confine and guide the buoys in their rise and fall in the waves or swells may be dispensed with, thus rendering the apparatus comparatively economical in construction and cost, all as hereinafter specified.

Figure 1 is a plan of an apparatus embodying my invention, the line *x x* therein indicating the coast or shore line, and showing the series of buoys extended out from said shore in the water of the sea and the shaft mounted in bearings on said shore. Fig. 2 is a vertical section of my apparatus, the coast and the sea being also seen in similar section.

A A A, &c., are buoys or analogous structures, which are placed in the water out from the line of coast or shore, and they are arranged in a series, so that the longitudinal axis of the series extends out from the coast-line over the distance of such a number of the waves or swells of the body of water as will make it certain that at all times some of the buoys will be rising on the waves while others are falling. The buoys may be placed indiscriminately relatively to each other on the line of the lateral axis of the series.

B B B, &c., are cables, one of which is attached by one of its ends to each buoy. The cable of each buoy then passes around a friction-pulley, $b$, or equivalent device, which is anchored to the sea-bottom. This may be done by mounting the pulley in a stout frame, $c$, fixed in a piece of masonry, C, set in the sea-bottom, as shown. Any other form of anchorage may be employed. The free end of the cable is then carried up onto the beach or shore, and passes over a clutch or equivalent device, D, on the shaft E, which latter is mounted in suitable bearings, as shown. When the buoy is so placed relative to said shaft that its cable approaches the shaft at other than a right angle to the longitudinal axis of the shaft, guide-pulleys $b'$ may be employed to cause the cables to pass to and over the shaft in a line at right angles to said axis thereof. Any other devices than the pulleys shown may be employed for this purpose. Upon the extremity of each cable, where it depends below the shaft, is secured a weight, F, which is a counter to the weight of the buoy displaced by the water at the opposite end of the cable. These weights may run in guideways in a suitable frame, as shown. The clutch D on the shaft, and over which the cable runs, should be so arranged that when the weight is drawn upward by the pull on the cable caused by the rise of its buoy on the waves or swells said clutch will turn loosely on the shaft in that direction, and so that when the weight is allowed to descend by the fall of the buoy in the trough of the waves or swells said clutch will engage the shaft, and thus the fall of the weight operates to rotate the shaft more or less in one direction during the entire descent of the weight.

It is evident that, the buoys being placed in the water in relation to each other and the waves or swells, as described, some of the buoys of the series will at all times be rising, while others are falling, and that hence, through the cables, clutches, and weights described, the shaft on the beach or shore will be continuously and uninterruptedly rotated in one direction.

It is also evident that many buoys of large size may be employed, and thus the power generated or imparted to the shaft on the beach by the motion of said buoys in the waves or swells may be very great, while at the same time the buoys may be placed indiscriminately relatively to each other on the line of the lateral axis of the series, and a shaft the length of which is considerably less than the sum of the diameters of all the buoys of the series may be employed. Thus the building of an expensive pier or frame-work to confine and guide the buoys in their rise and fall in the waves or swell will be avoided, as well as the employment of a long and costly shaft extending the length of said pier over the line of the buoys; and it is evident that while the buoys in my present apparatus are free to move vertically in the water they cannot escape from their assigned positions in the series. The buoys will, in addition to the "lifting" power of the waves or swell, feel the force of the impetus in a horizontal line of the waves or swells as they roll toward the shore, and this force will be utilized in lifting the weights F.

It is further evident that the force of the waves or swells coming from any direction upon the buoys will be felt thereby and will operate to cause the buoys to rise and fall.

Any device or combination of devices which will operate to perform the office of the clutches D may be employed in connection with the shaft, the cables, the weights, and the buoys.

In constructing the anchorage C care should of course be exercised to so arrange it that the cable which passes through it should at all times be free to run easily through the anchorage, so that the play of the buoy in the waves and the consequent lifting of the counter-weight will not be interfered with.

What I claim as my invention, and desire to secure by Letters Patent, is—

An apparatus for utilizing the wave or swell motion of a body of water to rotate a shaft for the production of power, consisting of a series of buoys the longitudinal axis of which series extends out from the coast or shore of the body of water over the distance of such a number or succession of waves or swells as that some of the buoys of the series will at all times be rising, while others are falling, in said waves or swells, and each buoy having an attached cable running freely through an anchorage on the sea-bottom, and thence to and over a shaft in bearings on the shore, and with a counter-weight upon its end beyond the shaft, said shaft being provided with devices in connection with each cable which permit the cable to run freely in the direction of the buoy without rotating the shaft, but which rotate the shaft when the cable runs in the opposite direction, whereby the buoys may be placed indiscriminately on the line of the lateral axis of the series, all combined and arranged to operate as and for the purposes specified.

Witness my hand December 20, 1881.

ISAIAH L. ROBERTS.

In presence of—
A. S. FITCH,
A. G. N. VERMILYA.